No. 894,974. PATENTED AUG. 4, 1908.
A. M. NICODEMUS.
COOKING UTENSIL.
APPLICATION FILED FEB. 17, 1905.
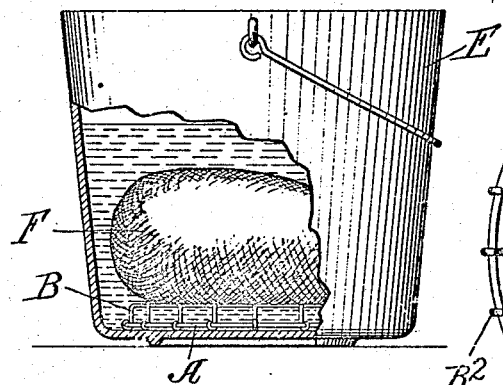
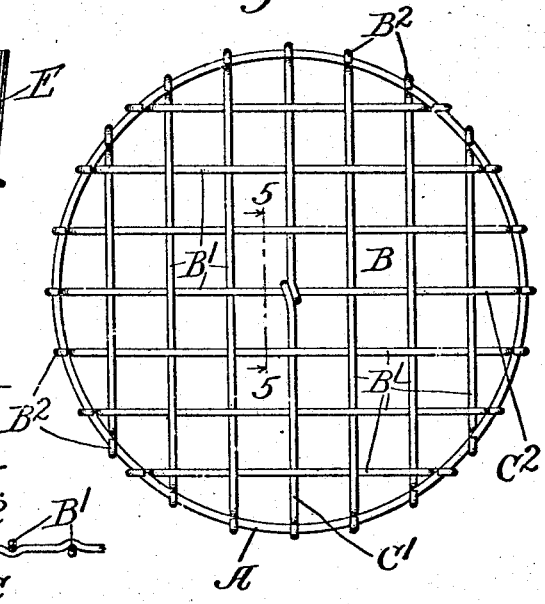
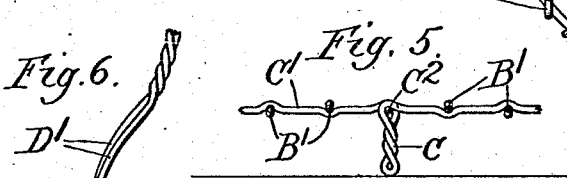
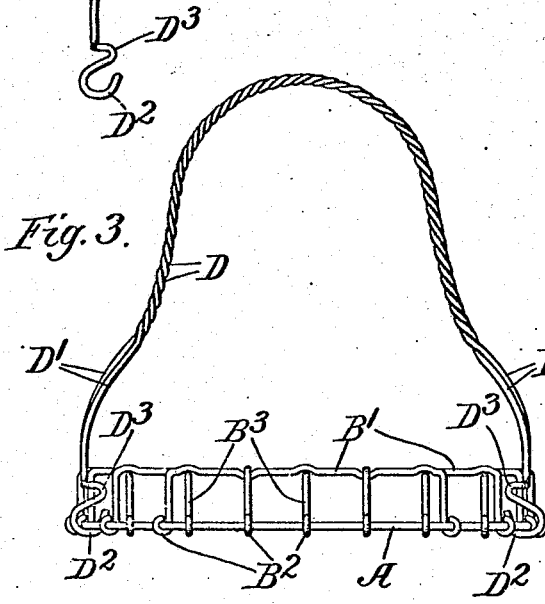
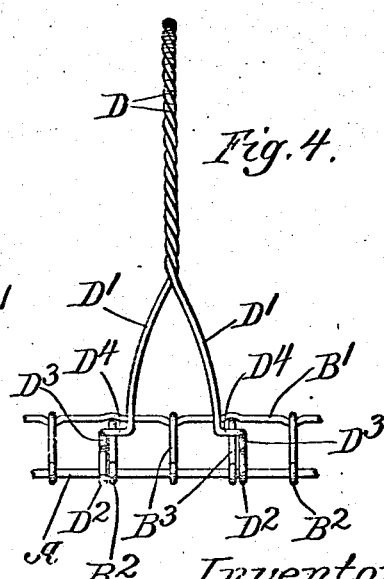
Witnesses.
Edward T. Wray.
Percival H. Truman
Inventor.
Anna M. Nicodemus
by Parker & Carter
Attorneys.

UNITED STATES PATENT OFFICE.

ANNA M. NICODEMUS, OF CHICAGO, ILLINOIS.

COOKING UTENSIL.

No. 894,974.  Specification of Letters Patent.  Patented Aug. 4, 1908.

Application filed February 17, 1905. Serial No. 245,987.

*To all whom it may concern:*

Be it known that I, ANNA M. NICODEMUS, a citizen of the United States, residing at Chicago, in the county of Cook and State of Illinois, have invented a certain new and useful Improvement in Cooking Utensils, of which the following is a specification.

My invention relates to cooking utensils and has for its object among other ends, to provide a device for supporting materials while being cooked in a pot or pan or other vessel.

The invention is illustrated in the accompanying drawings wherein

Figure 1 is a side view of an ordinary iron pot, the wall of which is broken away so as to show my device in place; Fig. 2, a plan view of the device; Fig. 3, an elevation showing the handle in position; Fig. 4, a similar view taken at right angles to Fig. 3; Fig. 5, a sectional view on line 5—5 of Fig. 2, and Fig. 6, a detail of the detachable handle.

My device has several different utilities as a cooking utensil, and is capable of being made use of in a number of different ways. One of its principal uses is to serve as a support for meats, vegetables or other matter while they are being cooked in water or a broth. In such case, it is desirable that the articles being cooked should not come into contact with the wall of the vessel, which is, of course, relatively hot in comparison with the liquid in which they are submerged. This arrangement prevents scorching if the liquid gets low, and at all times keeps the things being cooked from sticking to the bottom of the vessel.

My device is capable of being constructed in several different forms. I have here shown the device as circular, consisting of a ring of wire or other material, A, upon which is built up a woven fabric B. This is preferably composed of wires $B^1$ $B^1$ interwoven to form a rectangular mesh, such wires having the loops $B^2$ $B^2$ by which they are secured to the ring A and the vertical portions $B^3$ $B^3$, these raising the mesh or grating upon which the articles are to rest a slight distance above the bottom of the vessel upon which the device rests. The device may, of course, be of any shape or size, to meet different requirements, and if it has any considerable diameter, I prefer to construct it with a central support C which may be made by looping one of the central wires $C^1$ about the other central wire $C^2$ and then twisting the loop as shown in Fig. 5. There may, of course, be more than one of these supports as the occasion may demand.

In putting my device to the use indicated, it may or may not be used in connection with the detachable bail which I am about to describe. In practice, the bail will probably not be needed in this connection, and may be dispensed with. The device, however, can also be used in frying cakes and the like in kettles containing lard or oil. In that connection the bail will be a desirable feature.

The bail may be of any desired construction, but preferably I make it of two strands of stiff somewhat elastic wire D D which are twisted together at the center but spread apart at each end of the bail as shown at $D^1$ $D^1$, and provided each with a part to engage with the mesh of the mat. These engaging parts are each composed of a hook $D^2$ which extends under the ring A and of a loop $D^3$ in the wire above such hook which is bent in toward the center of the mat to abut against the vertical sections $B^3$ $B^3$ of the wires forming the mat, from this point, the wire $D^1$ being bent transversely somewhat, as shown at $D^4$. The wires $D^1$ have preferably an inward spring action tending to force the loops $D^3$ $D^3$ against the vertical sections of the mat. The twisted portion of the bail may be bent so as to give this part also a spring action which holds the hooks in firm engagement with the mat. If desired, of course, the mat may be used upside down with the bail attached thereto, thus forming a basket.

In Fig. 1, E represents an ordinary iron pot, the side being partially broken away so as to show my device resting on the bottom of the pot, F representing the article which is being cooked.

I have thus described one form of my device, but it is evident that there might be considerable modification made in form and in method of construction and, therefore, I do not limit myself to the particular devices and constructions here shown, but desire that the drawings be taken as in a sense diagrammatic and illustrative of the principle which my invention embodies.

I have already indicated certain of the uses to which my device may be put. When used to support meats, vegetables, or the like while being cooked in a liquid, as shown in Fig. 1, the device serves as a mat or rack holding the articles a proper distance from the bottom of the vessel and allowing the liquid to surround them on all sides. When the article is used for frying, the bail may be very quickly adjusted, the articles to be fried placed on the mesh formed by the wires B¹ B¹, and the device then submerged in the oil or grease. The articles being fried will, of course, float and may be properly turned and cooked, the rack or mat resting on the bottom of the vessel. When the articles are fried, they may be all lifted out together and dumped upon a plate, the engagement of the bail with the mat being rigid so as to allow the mat to be tipped up without slipping. The form of the mat may, of course, be considerably changed, the bail with its two pairs of engaging hooks being adapted to engage with almost any sort of woven wire mat or rack, even a flat one.

I claim:

1. In a cooking utensil, the combination of a rack comprising a substantially flat grating and a rim part with a detachable bail adapted to extend over the grating and provided at each end with two hooks to engage the rim part of the grating on opposite sides so that the same may be lifted and kept horizontal or be tilted substantially as and for the purpose described.

2. In a cooking utensil, the combination of a rack or grating composed of relatively thin pieces of material bent so as to form substantially vertical supporting parts with a detachable bail having hooks to engage therewith, and projections on the bail at each end to abut against the vertical supporting parts of the rack or grating so that the same may be tilted by means of the bail.

3. In a cooking utensil, the combination of a rack or grating of wire fabric having the edges bent to form a supporting part with a detachable bail, a hook on each end of the bail to extend under the edge of such fabric, and a loop to engage with the vertical portion of such fabric.

4. In a cooking utensil, the combination of a rack or grating with a bail having a pair of engaging members at each end, each of such members comprising a hook adapted to engage a horizontal part of such grating and a loop to engage with a vertical part thereof.

ANNA M. NICODEMUS.

Witnesses:
HOMER L. KRAFT,
LUCY A. FALKENBERG.